United States Patent [19]

Brown et al.

[11] Patent Number: 4,484,187
[45] Date of Patent: Nov. 20, 1984

[54] VIDEO OVERLAY SYSTEM HAVING INTERACTIVE COLOR ADDRESSING

[75] Inventors: James W. Brown; William S. Stoddard, both of Indianapolis, Ind.

[73] Assignee: AT&T Bell Laboratories, Murray Hill, N.J.

[21] Appl. No.: 392,001

[22] Filed: Jun. 25, 1982

[51] Int. Cl.³ .......................... G09G 1/02; G09G 1/28
[52] U.S. Cl. .................... 340/703; 340/721; 340/723; 340/724; 340/725; 340/747; 340/750
[58] Field of Search ............... 340/701, 703, 716, 721, 340/723, 724, 748, 750, 747, 798, 799, 792; 358/10

[56] References Cited

U.S. PATENT DOCUMENTS

| | | | |
|---|---|---|---|
| 4,121,283 | 10/1978 | Walker | 340/703 |
| 4,180,805 | 12/1979 | Burson | 340/724 |
| 4,225,861 | 9/1980 | Langdon, Jr. et al. | 340/703 |
| 4,232,311 | 11/1980 | Agneta | 340/703 |
| 4,262,302 | 4/1981 | Sexton | 358/10 |
| 4,317,114 | 2/1982 | Walker | 340/721 |
| 4,324,401 | 4/1982 | Stubben et al. | 273/85 |
| 4,364,037 | 12/1982 | Walker | 340/703 |
| 4,439,760 | 3/1984 | Fleming | 340/703 |

OTHER PUBLICATIONS

Siggraph '79, "Introduction to Raster Graphics", James Foley, 1979.

Primary Examiner—Gerald L. Brigance
Attorney, Agent, or Firm—M. A. Morra

[57] ABSTRACT

Apparatus and method are disclosed for selecting colors for presentation in a display device such as a CRT. The apparatus includes a pair of video memories that store picture element (pixel) data for presentation at the same location of the display device. A color map, or video look-up table, stores digitally encoded colors that are provided at its output in response to a digital input address. The digital input address is partioned into several portions. Pixel data from the first video memory supplies one portion of the digital input address while pixel data from the second video memory supplies another. Neither video memory has priority in selecting the color presented on the video display although the color map is programmable to give effective priority to either one.

The digital address is further partioned into a third portion to thereby define the color map as a plurality of segments. A data processor selects which segment of the color map is to be addressed by the video memories thereby changing priority and/or color palettes without alteration of the pixel data or the need to reprogram a segment of the color map.

14 Claims, 6 Drawing Figures

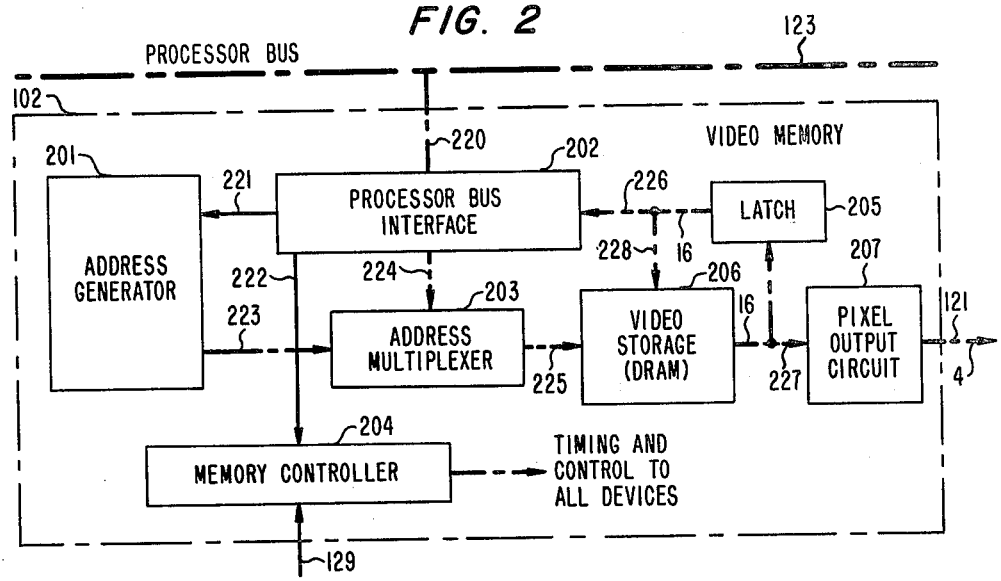
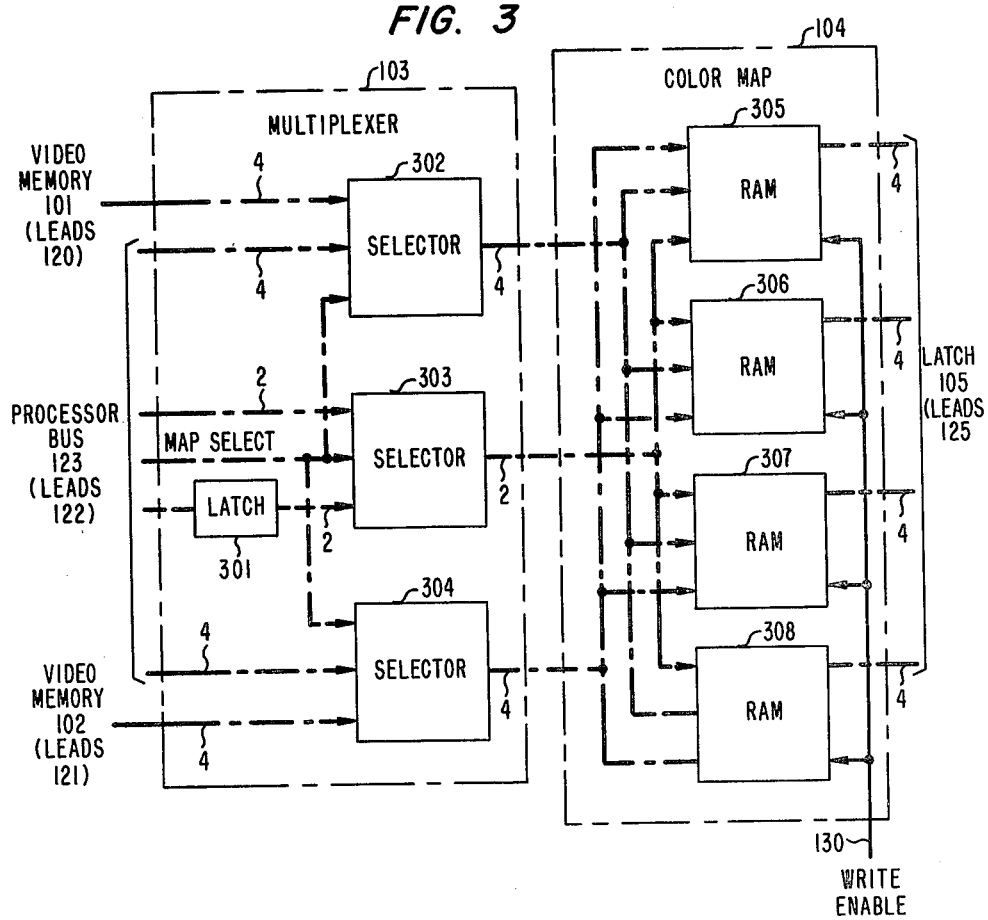

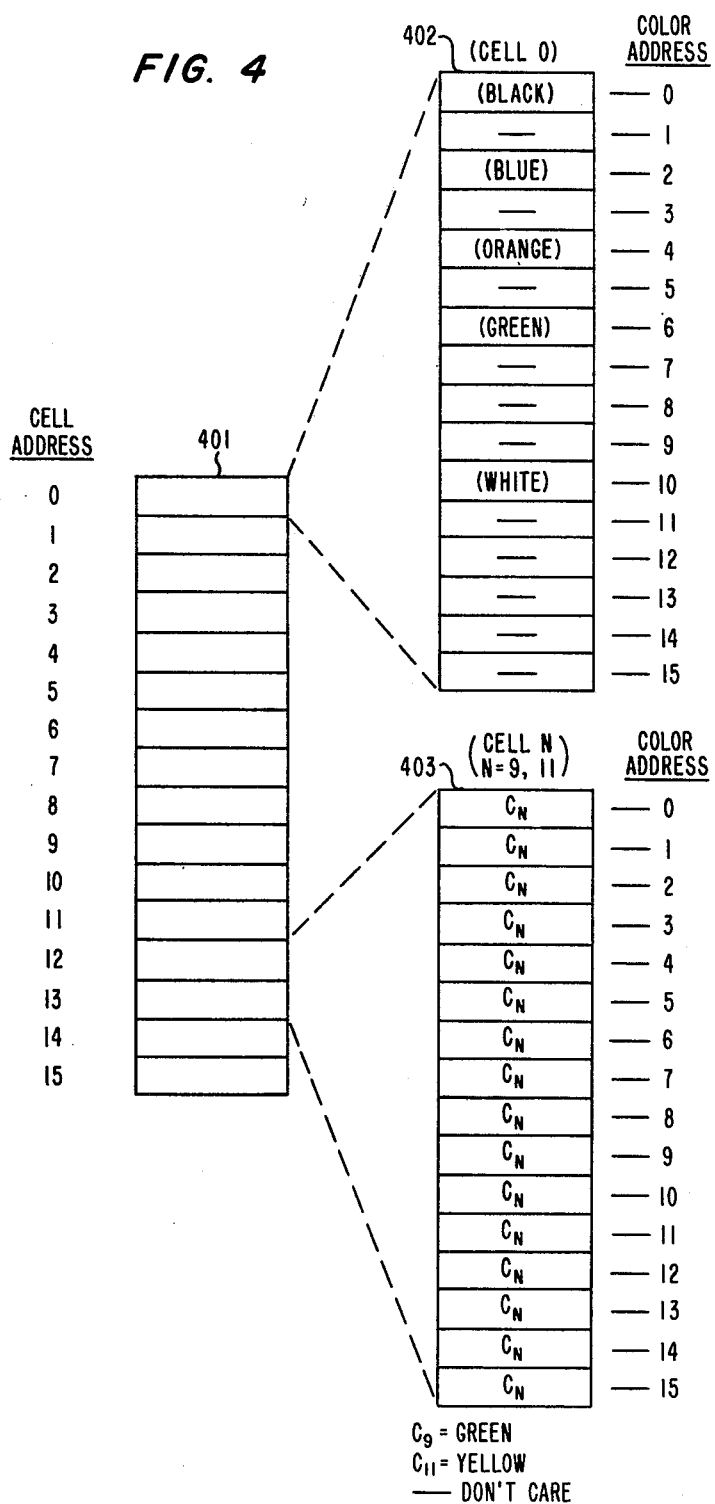

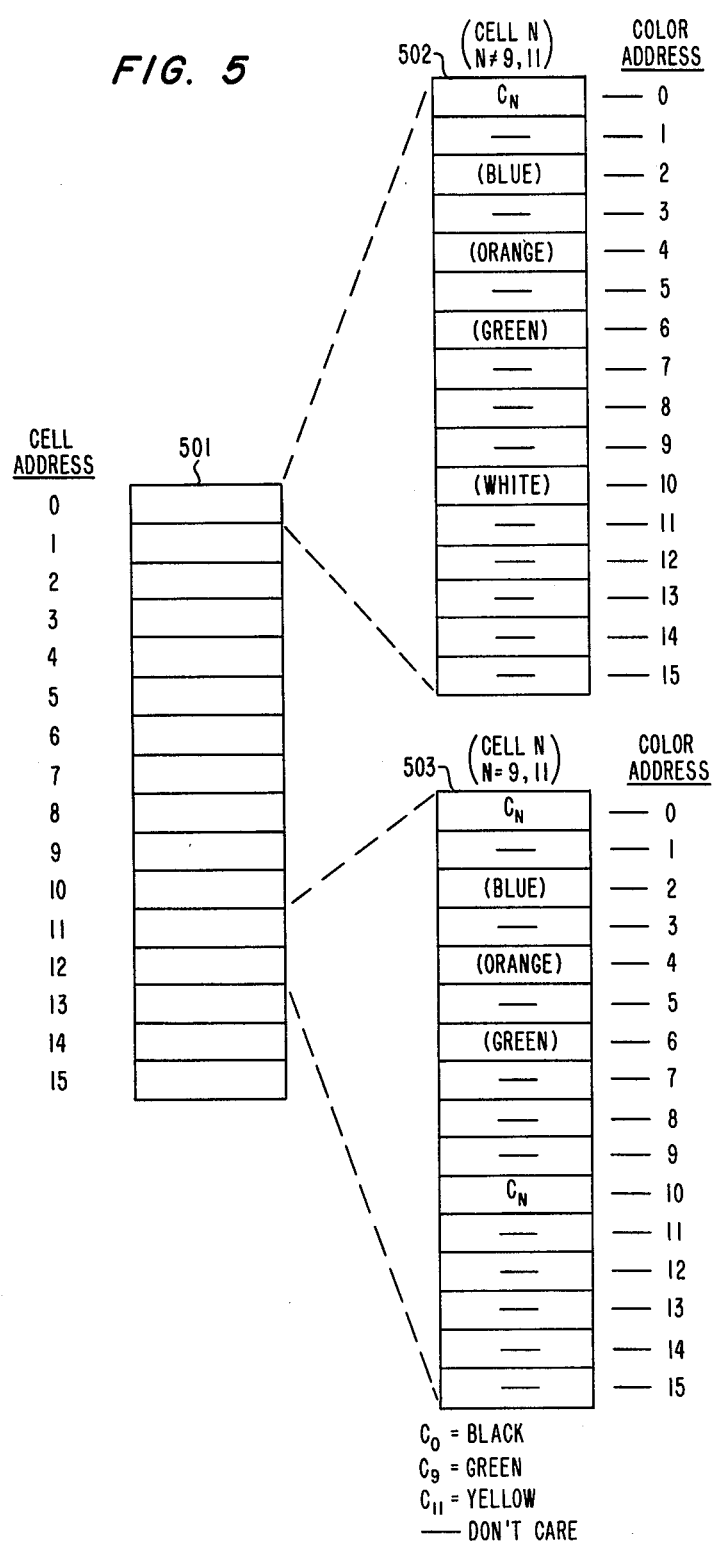

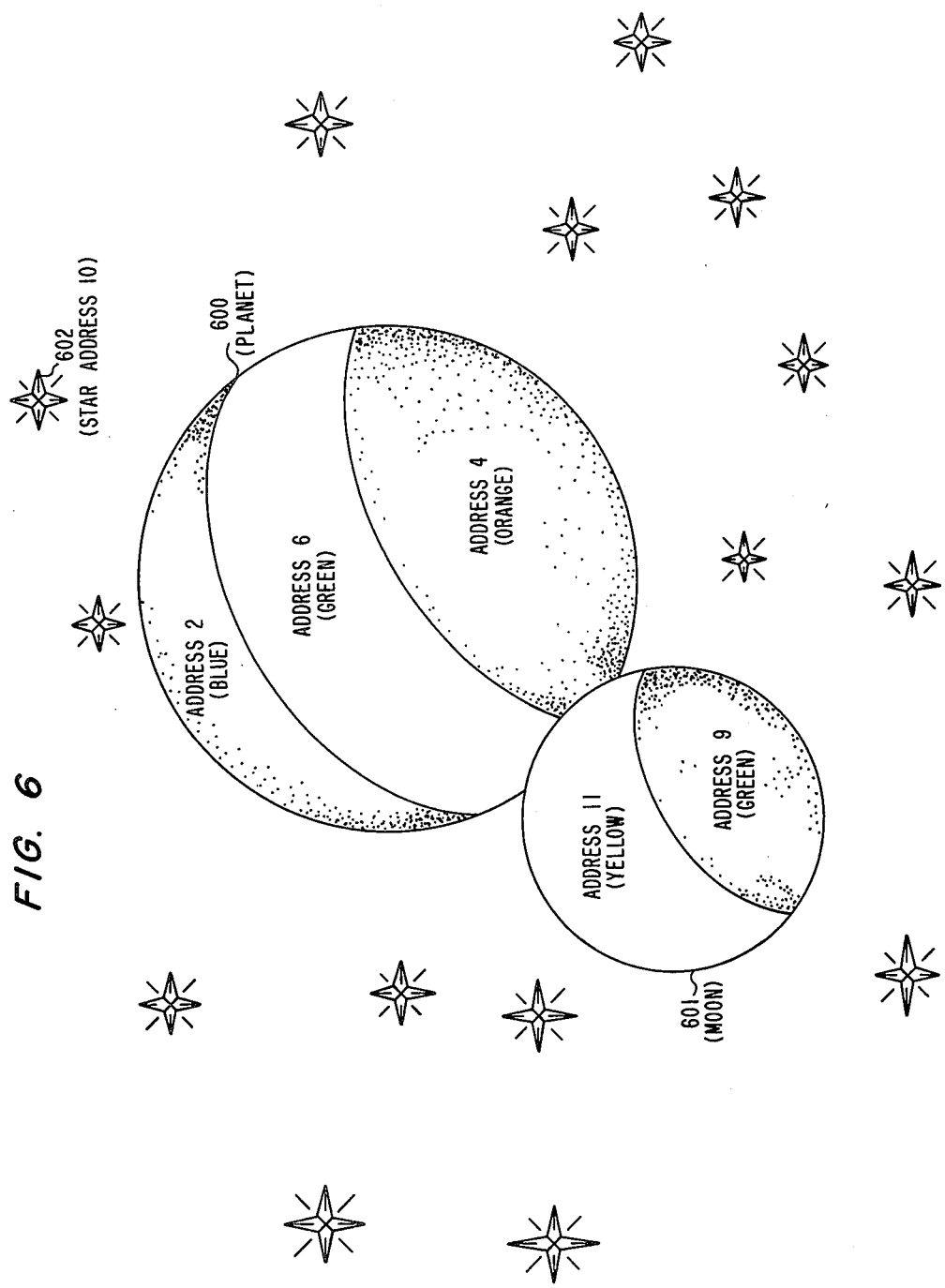

VIDEO OVERLAY SYSTEM HAVING INTERACTIVE COLOR ADDRESSING

FIELD OF THE INVENTION

This invention relates to visual display communication systems and, more particularly, to a method and apparatus for controlling the display of stored images.

BACKGROUND OF THE INVENTION

The use of a home television set has grown dramatically in recent years. Not only does it display real life images in full color and motion, but the current popularity of interactive video games and personal computers has created a large demand for computer generated images having color and motion also. These computer generated images are "built" from a large number of picture elements (pixels) having various colors. They are stored as binary digits in a so-called "video memory" and periodically retrieved from memory to refresh a picture on the television set.

In a two-dimensional visual display apparatus, such as a television set, it is desirable to create the effect of a third dimension whereby various images exist in different planes. The problem is made more complex when individual images are animated or otherwise required to move in front of some images yet behind others. In the prior art there are disclosed a number of methods for overlaying video images to thereby generate a three-dimensional effect.

One such method is disclosed in U.S. Pat. No. 4,317,114 issued on Feb. 23, 1982 to J. T. Walker. In this patent there is disclosed a plurality (n) of memories for superpositioning images over a host image. There are as many individual video memories as there are image planes, and pixels are given priority according to the particular video memory in which they are stored. Prioritization according to storage location is thus the vehicle for determining which image will overlay a competing image. Such a system minimizes the processing complexity associated with priortization while increasing the required hardware.

Another method for providing various image planes stores all pixels within a single memory; however when it is desired to display one or more objects in motion, the processing complexity and real-time consumption increases substantially.

It is therefore an object of the present invention to provide a video display technique in which images can be displayed in various planes and thereby portray depth in such displays.

It is another object of the present invention to modify the content and number of image planes without modification to the stored image data or to the hardware configuration.

It is yet another object of the invention to minimize the number of video memories required to generate the various image planes.

SUMMARY OF THE INVENTION

The present invention discloses first and second video memories storing pixel data for display on a CRT device. The pixel data comprises the address of a color stored in another memory known as a color map which is broken down into individual cells, each containing a plurality of colors. The color ultimately displayed on the CRT is chosen by having the first video memory select the cell address and the second video memory select the color address within the cell. Neither video memory has priority over the other in selecting a color; rather the manner in which the color map is programmed determines the priority of display. Reprogramming a color map is readily achieved by software means in a time interval shorter than vertical retrace.

It is a feature of this invention that it advantageously allows a user who would create a graphic display having movement to store moving images in one of the video memories and to store stationary images in the other, thereby simplifying the algorithm used to create movement.

It is another feature of this invention that the color map may be periodically reprogrammed, independent of the video memory and without hardware change, in a manner that changes the priority of display so that images that once were in the foreground are now in the background and vice versa.

It is yet another feature that more than two image planes may be created in a system having only two video memories.

These and other objects and features of the present invention will be apparent form the following detailed description in conjunction with the accompanying drawings.

BRIEF DESCRIPTION OF THE DRAWING

FIG. 2 is a block diagram illustrating the operation of a video memory such as used in connection with the present invention;

FIG. 3 discloses a multiplexer and color map, such as used in the present invention, showing their detailed structure and interconnection;

FIG. 4 illustrates a segment of the color map with various colors programmed in accordance with the invention such that in conjunction with FIG. 6 it illustrates a moon passing in front of a planet;

FIG. 5 illustrates a segment of the color map with various colors programmed in accordance with the invention such that in conjunction with FIG. 6 causes the moon to pass behind the planet;

FIG. 6 is a pictorial representation of the priority and animation problems solved by the principles of the present invention; it illustratively shows a moon passing in front of a planet against a background of stars.

DETAILED DESCRIPTION

Figure 1:
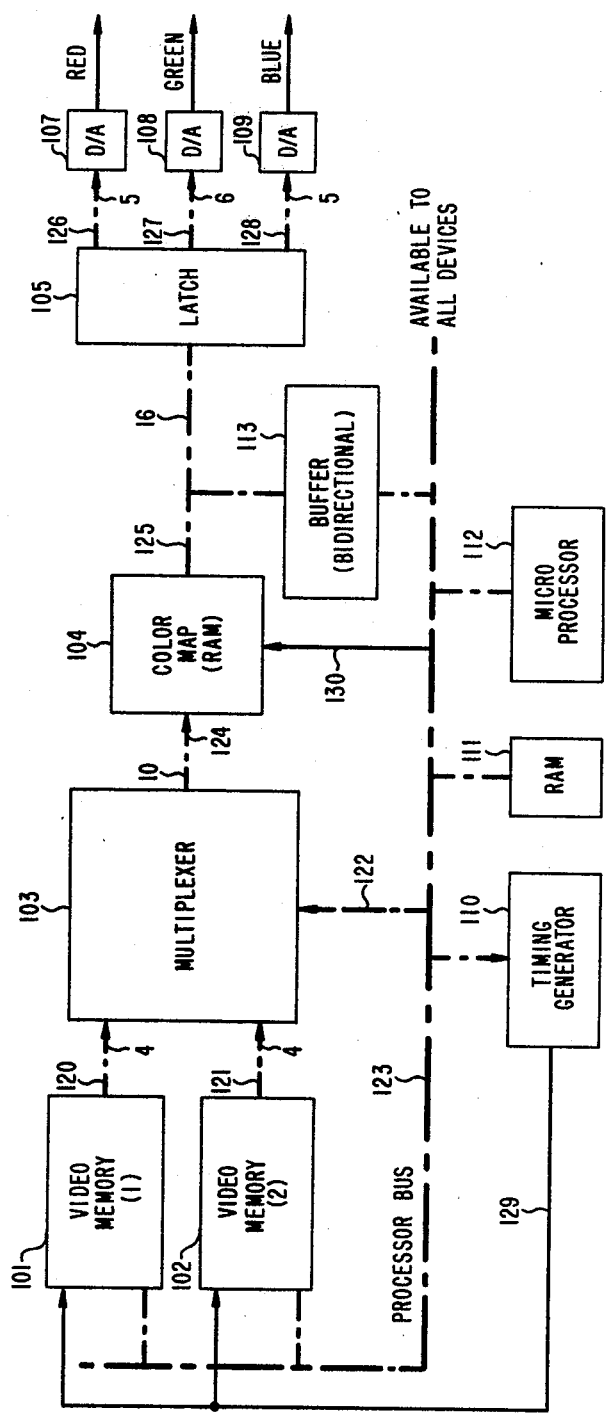
FIG. 1 is a block diagram of a video overlay system in accordance with the principles of the present invention.

FIG. 1 discloses a block diagram of an illustrative embodiment of a video overlay system capable of providing more than two image planes of display with only two video memories. Video memories 101 and 102, also designated as video memories 1 and 2, have substantially identical configurations and are shown in greater detail by FIG. 2. Each video memory stores a sufficient number of picture elements (pixels) to provide a full picture frame of display for a CRT device. An array of 256×256 pixels may be stored, although the typical aspect ratio of 4:3 would require less than 200 pixels of vertical resolution for 256 pixels of horizontal resolution. In this embodiment however, a maximum of 240 rows of pixels are displayed at one time due to the constraints of the NTSC display format.

Each of the pixels represents a particular color, selectable from a palette of available colors. Here, each pixel is represented by 4 binary digits thereby providing a selection from among 16 different colors. Video memories 101 and 102 are each capable of storing a full frame of picture information built from picture elements of 16 different colors.

Video memory 101 provides a 4-bit wide output signal, at the pixel rate, over leads designated 120. Similarly, video memory 102 provides a 4-bit wide output signal at the pixel rate over leads designated 121. These 4-bit signals are transmitted in a synchronous manner whereby pixels competing for the same location of the video frame are simultaneously presented to multiplexer 103. It is the relatively simple manner in which priority is given to one or the other of these 4-bit signals that best illustrates the advantages of the present invention.

Video memories 101 and 102 contain address generators that are synchronized by signals from timing generator 110 and made available to all using devices over lines 129. Here, only the video memories are shown connected to the timing generator. Timing generator 110 provides clock signals at the pixel rate (6.14 MHz), and twice the pixel rate (12.27 MHz). Timing generator 110 also provides horizontal drive and vertical active display signals for the purpose of synchronizing the scanning of the stored information in the two video memories and to define the interval of active display.

Color map 104 is responsive to a 10-bit wide word from line 124 to address one of 1024 possible storage locations containing color information. Each storage location contains a 16-bit word that defines a particular color in terms of its red, green, and blue components. Five bits are used to define the red component, 6 bits are used to define the green component, and 5 bits are used to define the blue component. It is possible to display a maximum of 65,536 different colors with such a 16-bit word although each video memory may only select one of 16 predetermined colors. Naturally, the color map may be reprogrammed to provide a different palette of 16 colors; the manner in which programming occurs is now outlined.

Processor bus 123, shown in FIG. 1, is available to all devices, although for the sake of functional clarity all connections are not shown. It is understood that each board connected to processor bus 123, does so by way of a bus interface circuit (see e.g., processor bus interface 202 discussed in connection with FIG. 2). Such a bus structure allows microprocessor 112 to communicate with any one of the boards using a common set of wires. In the present invention, the processor bus provides 20 address lines for addressing memory locations and I/O ports thereby allowing for 1 Mbyte total addressing space. In addition to the 20 address lines, processor bus 123 includes 16 data lines.

Color map 104 is programmed in response to a WRITE ENABLE command generated by microprocessor 112 and transmitted over the processor bus. For clarity, this signal is shown separately on lead 130. During this "write" mode, information stored in random access memory 111 or microprocessor 112 is delivered to color map 104 via processor bus 123 through bidirectional buffer 113 and leads 125. Buffer 113 isolates processor bus 123 from the output signals of color map 104. During the "write" mode, the binary data (16-bits wide) on leads 125 are stored at an address in color map 104 designated by the binary data (10-bits wide) on leads 122. Multiplexer 103 provides the function of passing either the map address designated by video memories 101 and 102 for display purposes, or the map address designated by random access memory 111 for programming purposes. It will hereinafter be shown that only small portions of the color map need to be reprogrammed in order to change priorities. Indeed, programming the entire color map requires only the time interval during vertical retrace. It will further be shown that when the storage devoted to the color map is large enough, it is possible to select from among a plurality of maps to effect new priorities rather than reprogram an existing color map.

Information emanating from color map 104 over leads 125 is buffered by latch 105 which performs a sample-and-hold operation on the 16-bit parallel word. The parallel word comprises a red component present on leads 126, a green component present at leads 127, and a blue component present at leads 128. These components are encoded as a binary digital number and are converted to analog voltage levels by digital-to-analog (D/A) converters 107, 108 and 109 respectively.

By way of a brief summary then, video memories 101 and 102 each store full frames of picture data. These data are but addresses in a programmable color map 104. Microprocessor 112 in cooperation with random access memory 111 and multiplexer 103 control the contents of color map 104. Binary data emanating from the color map is buffered by latch 105 and converted to analog voltage levels through D/A converters 107, 108 and 109. Control information is made available to all devices over processor bus 123. Timing generator 110 is the distributor of pixel clock, horizontal, and vertical timing signals, and is responsive to control information from microprocessor 112 for the synchronization of same.

A number of the devices used in constructing the invention are commercially available without further modification. Acceptable devices include the Intel 8086 microprocessor, the Analog Devices DAC-08EQ digital-to-analog converter, and the Intel Multibus for which detailed information regarding its operation is readily available. The more important blocks of FIG. 1 with respect to the invention include video memories 101 and 102, multiplexer 103 and color map 104. These devices are hereinafter discussed individually and in greater detail.

FIG. 2 discloses video memory 102 which has the same configuration as video memory 101. Each video memory provides digital storage capability for an image comprising 256×256 pixels, each pixel comprising 4 binary digits. The number of displayed pixel rows is limited to 240 in a non-interlaced NTSC display system. Each video memory provides a 4-bit wide output at the pixel rate.

Processor bus interface 202 accepts timing information and handles all interaction with microprocessor 112 of FIG. 1. Bidirectional leads 220 interconnect processors bus interface 202 and processor bus 123. Address information for programming video storage 206 with pixel data is transferred over leads 220 to processor bus interface 202, over leads 224 to address multiplexer 203, and finally over leads 225 to video storage 206. The actual pixel data is transferred to video storage 206 over leads 226 and 228 from processor bus interface 202. Processor bus interface 202 includes a plurality of address decoders (Intel type 3205 are deemed acceptable) for recognizing data on the bus intended for a particular video memory. Data from video storage 206 may be transferred through latch 205 and interface 202 to the processor bus. More detailed information on an acceptable processor bus interface may be found in Intel Application Note AP-28A, January, 1979 entitled "Intel Multibus Interfacing."

Address generator 201 receives control and timing information from memory controller 204 and from processor bus interface 202 over lines 221. This information includes signals for synchronizing horizontal and vertical counters as well as horizontal and vertical scroll registers. Address generator 201 performs the overall function of sequentially addressing pixels in video storage 206 for display in the manner consistent with conventional CRT scanning techniques. During display, the addresses that emanate from generator 201 over lines 223 pass directly through address multiplexer 203 and lines 225 into video storage 206. However, when it is desirable to write new information into video storage 206, address data is supplied from processor bus interface 202 over a path that includes lines 224 and 225 in order to select the proper location in video storage 206. The new information to be written into video storage 206 is supplied over bidirectional lines 226 and 228.

Video storage 206 is a Dynamic Random Access Memory (DRAM) used to store encoded pixel data. Approximately 32 kilobytes of memory are needed to store 256×256 pixels, each 4-bits wide. These pixels are addressed in groups of 4 (i.e., 16 bits at a time) with pairs of 7-bit addresses presented on line 225. The first 7-bit address of the pair is used to select a row while the second 7-bit address is used to select a column. These rows and columns do not represent the rows and columns of the CRT display.

The 16-bit wide output of video storage DRAM 206, present on leads 227, is stored in latch 205 and made available to processor bus interface 202 over leads 226 so that microprocessor 112 can examine the contents of DRAM 206. DRAMs of a type designated MK4332D-3, manufactured by Mostek, are acceptable in this application.

Pixel output circut 207 operates substantially as a parallel to serial converter in that it accepts 16-bit wide data on input 227 and converts it into four 4-bit output groups to be presented one at a time on output 121. Control signals for this operation are suppplied by memory controller 204.

Memory controller 204 is responsive to timing and control signals received on input lead 129 and 222. Received signals include: pixel clock, 2X pixel clock, horizontal drive, and vertical active display. Memory controller 204 generates the timing signals required for operation of the dynamic RAMs and provides control signals to the other blocks shown in FIG. 2.

FIG. 3 discloses, in greater detail, the multiplexer and color map of FIG. 1. Address data entering multiplexer 103 is selectably applied to color map 104. Once selected, color map 104 provides a 16-bit output signal on leads 125 representing a particular color.

Multiplexer 103 selects one 10-bit address to be presented to color map 104. The 10-bit address either comes substantially from video memories 101 and 102 or from processor bus 123 depending on a state of the map select signal. During active display, the video memory signals are used to address the color map; during a time when the color map is being programmed, the processor bus signals are used to address the color map. Multiplexer 103 includes selectors 302, 303 and 304 for which an acceptable device is the 74LS157, commercially available from several manufacturers under the same basic code. Selectors 302 and 304 are sufficient to fully handle the 8 bits of data provided by video memories 101 and 102. Selector 303 delivers an extra 2 bits of address data to provide a total of 10 bits with which to address the color map. Ten bits is a convenient address size for commercially available 1024 by 4 bit RAMs such as are utilized in color map 104.

In the present embodiment of the invention, color map 104 is divided into 4 segments. Within each segment the 8-bit address supplied by video memories 101 and 102 selects a unique location. The 2-bit address entering selector 303 determines which of the 4 segments within color map 104 will be used. This 2-bit address is supplied by microprocessor 112 over processor bus 123. During display, the segment address is maintained in latch 301 and delivered to color map 104 through selector 303. During the "write" mode, the map select signal enables another pair of address leads entering selector 303 (also from the microprocessor) to be delivered to color map 104. This feature not only provides different palettes but, as will be shown hereinafter, when properly programmed can instantly provide different priority for the various images stored in the video memories. FIGS. 4 and 5 illustrate how an individual segment of the color map may be programmed to achieve different priorities. Since the illustrative embodiment discloses a four segment color map, it is the designer's option to either store segments individually or to reprogram one when different image priorities are desired.

Color map 104 of FIG. 3 comprises static RAMs 305, 306, 307, and 308 each storing 1024 4-bit words. The 10-bit address provided by multiplexer 103 selects one of the 1024 possible locations in each RAM. Responsive to the particular input address, each of the RAMs deliver a 4-bit wide output signal. The RAMs in parallel combination therefore provide a 16-bit wide output signal on leads 125 representing a particular color. The operation of color map 104 and the manner in which it controls priorities may be more easily understood by considering one segment of the map and how video memories 101 and 102 advantgeously interact to address it. FIGS. 4 and 5 each disclose one segment of color map 104 programmed in a slightly different manner to achieve different priorities. FIG. 5 may represent a different segment of a color map or a reprogrammed version of the segment illustrated in FIG. 4. Before a specific example of programming is considered however, an understanding of how a segment is programmed and addressed is needed.

FIG. 4 discloses segment 401 of color map 104 which is subdivided into 16 cells having addresses 0–15. Cell 402 whose address is "0" and cell 403 whose address is "N" (N=9, 11) are illustrated in detail. Note that each cell is subdivided into 16 color addresses 0–15. For example, the color green is stored at color address 6 of cell address 0. Note also that cell 403 is illustratively programmed to store all the same color, $C_N$, at cell addresses 9 and 11.

In the present invention video memories 101 and 102 do not store colors per se to represent pixels; rather, these video memories store color addresses while the colors themselves are stored in color map 104. Video memory 101 contains 4 bits for each pixel of data; and these 4 bits are utilized to select a particular cell address. Video memory 102 also contains 4 bits for each pixel of data; but these 4 bits are utilized to select a particular color address. Thus, neither video memory has priority over the other in selecting a color unless the color map is programmed to allow it. For example, if all colors at a particular cell address are identical, then video memory 101 is the only relevant input for color selection. On the other hand, if the colors at a particular color address in all cells are identical, then video memory 102 is the only relevant input for color selection. Thus, by utilizing one video memory for cell addresses and the other for color addresses, priority of display becomes a function of color map programming. It is noted that although the color map is defined in terms of cell and color addresses, it may be similarly defined as a two-dimensional array in terms of column and row addresses. A specific example of the manner in which the color map may be programmed to achieve a desired arrangement of priorities is discussed below.

FIG. 6 illustrates a moon 601 passing in front of a planet 600 against a backdrop of stars 602. Information regarding the size and shape of moon 601 is stored in video memory 2 and information regarding the size and shape of planet 600 and stars 602 is stored in video memory 1. This is a convenient way to partition the information because it is desirable to display the movement of the moon around the planet. Since the moon is the only object stored in video memory 2, the algorithm required to move the moon in an x-y plane is trivial. It is only necessary to reorder the priority of display as between the moon and the planet at various times in order to create the illusion of depth in the two-dimensional display system.

As has been stated previously, each picture element stored in video memory 2 represents a cell address (not a color address). In order to have the moon pass in front of the planet, every location within cell address 9 and cell address 11 of the color map is loaded with the same color. If for example, the moon were to be yellow on top and green on the bottom, then the color map would have cell address 11 completely loaded with the color yellow and cell address 9 completely loaded with the color green. Note the intersection of the moon and the planet in FIG. 6. At this intersection, video memory 2 is requesting cell address 11 and video memory 1 is requesting color address 6. Since all the colors in cell address 11 are yellow, then yellow will be the displayed color.

Referring to cell addresses 9 and 11 (shown as block 403) in FIG. 4, all color addresses (0–15) are encoded with the same binary digits and illustratively represent the colors green and yellow respectively. The remaining portions of video memory 2 are encoded to be transparent. This is achieved, for the purpose of illustration, by assigning address 0, in video memory 2 to all picture elements other than those associated with the moon. In FIG. 4, cell address 0 (shown as block 402) contains up to 16 different color addresses which are selected in accordance with the contents of video memory 1. Cell address 0 is thus encoded with colors for images stored in video memory 1. Other cells, such as 3, 5, 7 etc. may similarly be encoded with colors for images stored in video memory 1, but with a completely different selection of colors.

After the moon has completed that portion of its movement in front of planet 600 it is desirable to now have it pass behind the planet. There are several ways that this can be achieved—the most obvious of which might be to transfer the planet data from video memory 1 into video memory 2; transfer the moon data from video memory 2 into video memory 1; and repeat the above described technique of loading cell addresses 2, 6, and 4 completely with the planet's colors. If, however, it is desirable to keep moving objects in video memory 2 for programming ease, then another color map loading technique is appropriate and described below.

With the picture element data describing the moon in video memory 2, the color map is reconfigured as shown in FIG. 5. Color map 501 is shown as having 16 cells each of which may be programmed to contain a plurality of colors. Typical cell "N" is illustrated in block 502 having 16 possible colors. As before, video memory 2 contains image data for the moon and the stored picture element data represents a cell address. For the moon to now pass behind the planet, priority needs to be given to picture element information stored in video memory 1 which contains the so-called "background" image data. Thus, when video memory 2 specifies a particular cell, and that cell only contains color data for video memory 1 images, then video memory 1 effectively has priority. As shown in blocks 502 and 503, planet colors blue, orange and green are respectively loaded into color addresses 2, 4 and 6 of all cells.

Transparent pixels of video memory 1 are encoded as color address 0. In order to give the moon priority over such transparent pixels, the moon's colors are stored at color address 0 in all cells. In a similar manner the transparent pixels of video memory 2 are encoded as cell address 0. When both video memories are calling for address 0, the color black is displayed. This is achieved by loading cell address 0, color address 0 with all zeros which represents the color black. Some other color could be displayed instead of black, if desired.

It is finally of interest to have the moon go behind the planet yet stay in front of the stars. To accomplish this it is only necessary to make a minor adjustment to the color map. This adjustment is illustrated in blocks 502 and 503 of FIG. 5. The stars are displayed with the color white which is initially loaded into color address 10 of all cells as shown in block 502. However, in order to give priority of display to the moon at picture element locations where it overlays a star, it is necessary to replace the star's image with the moon's image at those color addresses where there is contention. Since the moon's colors are required only when cell 9 or 11 is addressed and the star's color is stored only at color address 10; then by loading the color green (bottom of moon) into color address 10 of cell 9, and loading the color yellow (top of moon) into color address 10 of cell address 11, any contention between the moon and stars will be resolved in favor of the moon.

Three planes of image data are thus illustrated in the example video display of FIG. 6. Clearly more are possible, but the maximum number depends on the number of colors used in the various image planes. In this fairly simple example, the only changes required to rearrange the relative priorities of the moon and the planet are at color address 2, 4 and 6 of cell addresses 9 and 11. These six locations of the color map may be reprogrammed in a very short time interval. Of equal importance is the fact that the storage required for the new priority information is minimal.

What is claimed is:

1. A digital image display system including first and second video memories for storing picture element data that address colors for presentation at specific locations in a video display, and means for simultaneously accessing picture element data from each video memory for presentation at the same specific location of the video display

CHARACTERIZED BY:

a color map, having input and output ports, for storing digitally encoded colors and providing same at its output port in response to a digital address at its input port, said digital address comprising at least two portions;

means interconnecting the output of the first video memory and the input to the color map such that the picture element data of the first video memory becomes one portion of said digital address;

means interconnecting the output of the second video memory and the input to the color map such that the picture element data of the second video memory becomes another portion of said digital address; and means responsive to the digitally encoded colors at the output port of the color map for applying same to the video display.

2. The digital image display system according to claim 1 wherein the first video memory stores picture element data for stationary images and the second video memory stores picture element data for movable images.

3. The digital image display system according to claim 1 wherein said color map comprises a plurality of locations each having a particular color address and storing a digitally encoded color, said locations being grouped into cells, each having a particular cell address

FURTHER CHARACTERIZED IN THAT:

said one portion of the digital input address corresponds to the cell address; and said another portion of the digital input address corresponds to the color address.

4. The digital image display system of claim 1 wherein the color map includes various memory regions, each storing a plurality of digitally encoded colors at locations addressable by the picture element data of said first and second video memories, FURTHER CHARACTERIZED IN THAT the color map is responsive to a selection signal for enabling one of the various memory regions whereby image priority and color palette may be changed without modification of the picture element data or the color map.

5. A digital image display system including first and second video memories for storing picture element data, said picture element data in each video memory representing addresses in a color map for accessing colors from said color map for display on a video raster

CHARACTERIZED BY:

said color map having a plurality of sector locations whose addresses are selected by the picture element data of the first video memory, said sectors containing a plurality of storage locations whose addresses are selected by the picture element data of the second video memory, each of the storage locations containing one or more binary digits for decoding as a particular color;

means for converting the selected binary digits into plural voltage levels, each representing a unique color component; and means responsive to said plural voltage levels for displaying the color components on the video raster.

6. A method for selecting colors for presentation in a video display system having first and second video memories that contain color address data for presentation at the same particular location of a display device including the steps of:

storing predetermined colors in a color map that provides a digitally encoded output signal representing one of the predetermined colors in response to an input address signal, said input address signal having first and second portions;

applying the color address data from the first video memory to the color map as the first portion of the input address signal;

applying the color address data from the second video memory to the color map as the second portion of the input address signal;

converting the digitally encoded output signal from the color map into one or more discrete voltage levels; and applying said one or more discrete voltage levels to the display device in a manner that causes one of the predetermined colors to appear at said particular location of the display device.

7. The method of claim 6 wherein the first portion of the input address signal corresponds to the address of a cell containing a plurality of colors, and the second portion of the input address signal corresponds to the address of a color within the cell, further including the step of:

loading colors for image data of the first video memory into all color locations of a cell address designated by image data of the first video memory whereby priority of display is given to image data of the first video memory.

8. The method of claim 6 wherein the first portion of the input address signal corresponds to the address of a cell containing a plurality of colors, and the second portion of the input address signal corresponds to address of a color within the cell, further including the step of:

loading colors for image data of the second video memory into all cells at a color address designated by image data of the second video memory, whereby priority of display is given to image data of the second video memory.

9. Apparatus for accessing digitally encoded colors in a video display system including a video raster, said display system further including first and second video memories for storing picture element data and a color map for storing digitally encoded colors effectively indexed by column and row designation

CHARACTERIZED BY:

means providing the picture element data from the first video memory to the color map as said column designation;

means providing the picture element data from the second video memory to the color map is said row designation; and means responsive to the digitally encoded colors stored in the color map at the locations selected by said first and second video memories for converting same into a picture for display on the video raster.

10. The apparatus of claim 9 wherein the picture element data stored in each video memory comprises four binary digits, whereby a selection from among 16 color groups is provided.

11. The apparatus of claim 10 wherein the color map includes 256 locations, jointly addressable by the first and second video memories, each location storing a predetermined color.

12. The apparatus of claim 9 further including one or more additional color maps, and processor means for selecting from among color maps.

13. Apparatus for selecting one of a plurality of colors, digitally encoded and stored in a look-up table, for display on a video raster, including processor means and first and second video memories for storing image data, said look-up table comprising a plurality of memory sectors each of which contains a plurality of locations for storing the digitally encoded colors
CHARACTERIZED BY:
means responsive to signals from the processor for enabling one of the memory sectors of the look-up table;
means jointly responsive to image data from said first and second video memories for accessing one of said digitally encoded colors within the enabled memory sector; and
means responsive to the accessed digitally encoded color for displaying the corresponding color on the video raster.

14. A video display system for generating pictures comprising a plurality of picture elements encoded as one or more binary digits, said system including first and second video memories for storing color address data, and means for simultaneously accessing from each memory the color address data associated with the same particular position on the generated picture
CHARACTERIZED BY:
means for storing groups of picture elements at one or more cell locations;
means responsive to color address data from said first video memory for selecting a particular cell location;
means responsive to color address data from said second video memory for accessing a particular picture element from said selected cell location; and
means for converting the accessed picture element from binary digits into a corresponding color at said particular position on the generated picture.

* * * * *